US011909133B2

(12) United States Patent
Zaid et al.

(10) Patent No.: US 11,909,133 B2
(45) Date of Patent: Feb. 20, 2024

(54) DIELECTRICALLY LOADED PRINTED DIPOLE ANTENNA

(71) Applicants: Jamal Mohamed Ahmouda Zaid, Gatineau (CA); Halim Boutayeb, Kanata (CA); Peiwei Wang, Ottawa (CA)

(72) Inventors: Jamal Mohamed Ahmouda Zaid, Gatineau (CA); Halim Boutayeb, Kanata (CA); Peiwei Wang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 451 days.

(21) Appl. No.: 17/102,240

(22) Filed: Nov. 23, 2020

(65) Prior Publication Data

US 2022/0166145 A1 May 26, 2022

(51) Int. Cl.

*H01Q 9/16* (2006.01)
*H01Q 15/14* (2006.01)
*H01Q 21/06* (2006.01)
*H01Q 1/38* (2006.01)

(52) U.S. Cl.

CPC ................ *H01Q 9/16* (2013.01); *H01Q 1/38* (2013.01); *H01Q 15/14* (2013.01); *H01Q 21/06* (2013.01)

(58) Field of Classification Search

CPC ........ H01Q 9/16; H01Q 15/14; H01Q 1/2291; H01Q 9/065; H01Q 19/108; H01Q 21/06; H01Q 21/24; H01Q 21/28

See application file for complete search history.

(56) References Cited

U.S. PATENT DOCUMENTS

| | | | |
|---|---|---|---|
| 10,270,185 | B2 | 4/2019 | Boutayeb et al. |
| 2015/0123864 | A1 | 5/2015 | Boryssenko et al. |
| 2018/0248266 | A1 | 8/2018 | De Rochemont |

FOREIGN PATENT DOCUMENTS

| | | | | |
|---|---|---|---|---|
| CN | 102217140 | A | 10/2011 | |
| CN | 105576362 | A | 5/2016 | |
| CN | 205488534 | U * | 8/2016 | ............... H01Q 1/42 |
| CN | 106450751 | A | 2/2017 | |
| CN | 108172978 | A | 6/2018 | |
| CN | 108511914 | A | 9/2018 | |
| CN | 110518338 | A | 11/2019 | |
| CN | 218448440 | U * | 2/2023 | ............... H01Q 1/42 |

OTHER PUBLICATIONS

Jamshed, M. A., et al. "A Dipole Sub-Array With Reduced Mutual Coupling for Large Antenna Array Applications", IEEE Access, Nov. 2019. 2019.

Fritz-Andrade, E., et al. "Characteristic mode analysis applied to reduce the mutual coupling of a four-element batch MIMO antenna using a defected ground structure" IET Journal, Nov. 2019. 2019.

* cited by examiner

*Primary Examiner* — Hoang V Nguyen

(57) ABSTRACT

A dielectrically loaded printed antenna element is described. The antenna element includes at least one conductive arm supported on a substrate. The conductive arm is dielectrically loaded with at least one high dielectric material that is configured to provide spatial coverage of the conductive arm. An antenna array structure is also described that includes at least a first dielectrically loaded antenna element for transmitting and a second dielectrically loaded antenna element for receiving. The transmitting antenna element is aligned orthogonal to the receiving antenna element to further reduce interference.

21 Claims, 17 Drawing Sheets

Smith Chart 2

DIELECTRICALLY LOADED PRINTED DIPOLE ANTENNA

FIELD

The present disclosure relates to antennas, and in particular antennas printed on printed circuit boards (PCBs) used for wireless communication.

BACKGROUND

In-band full-duplex radio technology has been of interest for wireless communications, including for use in fifth-generation (5G) wireless networks, with transmission and reception of radio signals using a common antenna and transceiver. In full-duplex communications, transmission signals and reception signals are communicated using the same time-frequency resource (e.g., using the same carrier frequency at the same time). As a result, overall throughput of the channel can be increased by a factor of two.

Multiple Inputs Multiple Outputs (MIMO) is a method for multiplying the capacity of a radio link using multiple transmission and receiving antennas to exploit multipath propagation in which full-duplex antennas may provide efficient and flexible utilization of wireless communication resources; increasing the capacity of the communication networks; and guaranteeing reliable communication. The presence of multiple antennas means that high isolation is required between transmit and receive antennas in order to minimize self-interference (SI), particularly in the received signal. For example, in a closely packed two-dimensional (2D) array antenna, there is a relatively high level of SI leakage signal from the transmit path to the receive path, due to internal and external couplings. In a full-duplex array antenna, this SI, which is caused by mutual coupling from transmitter to receiver, should be reduced (e.g., to below the thermal noise floor) to avoid significant system interference or distortion in the receiver. Many techniques have implemented which include defected ground structure, parasitic elements, Electromagnetic Bandgap (EBG), and Near-Field Resonators (NFRs). However, for such techniques, isolation is generally provided at the expense of narrow bandwidth (e.g. −20 dB bandwidth of 1% to 5% of the resonance frequency) and relatively larger antenna size.

It is desirable to provide an antenna that may provide high isolation for full duplex communication with improved insertion loss, bandwidth, and reduced antenna size.

SUMMARY

An antenna element is described that includes a conductive arm supported on a substrate, the conductive arm being configured to transmit or receive electromagnetic signals. A dipole antenna includes a high dielectric material configured to provide spatial covering of the conductive arm on the substrate. The high dielectric material is configured to direct electromagnetic field radiation to mitigate interference.

An array antenna is also described comprising a transmitting antenna element as described in any of the preceding aspects/embodiments and a receiving antenna element as described in any of the preceding aspects/embodiments located on a reflector element. The receiving dipole antenna element is aligned orthogonal to that of transmitting antenna element to mitigate self interference between the transmitting and receiving antenna elements.

In one aspect, the present disclosure provides an antenna element comprising: a substrate having a first surface; at least one conductive arm configured to receive or transmit electromagnetic signals, the conductive arm being provided on the first surface of the substrate; at least one high dielectric material configured to provide spatial covering of the conductive arm on the first surface of the substrate, wherein the high dielectric material is configured to direct electromagnetic fields to mitigate interference.

In another aspect, the present disclosure provides an antenna array structure comprising: a reflector element; a first antenna element supported on the reflector element, the first antenna element having a first high dielectric material configured to provide spatial coverage of a first conductive arm, wherein the first conductive arm is aligned on the reflector element in a first direction and configured to receive electromagnetic signals in a first polarization direction; and a second antenna element supported on the reflector element, the second antenna element having a second high dielectric material configured to provide spatial coverage of a second conductive arm, wherein the second conductive arm is aligned on the reflector element in a second direction and configured to transmit electromagnetic signals in a second polarization direction; wherein the first direction is orthogonal to the second direction to mitigate interference between the first and second antenna elements.

In any of the above aspects, the antenna element may be a dipole antenna element, the dipole antenna element comprising: a first conductive arm; a second conductive arm; a first high dielectric material configured to provide spatial covering of the first conductive arm; and a second high dielectric material configured to provide spatial covering of the second conductive arm.

In any of the above aspects, the first conductive arm may be provided on the first surface of the substrate, and the second conductive arm is provided on an opposing second surface of the substrate.

In any of the above aspects, the substrate may have a first dielectric constant value, and the at least one high dielectric material has a second dielectric constant value that is greater than the first dielectric constant value.

In any of the above aspects, the second dielectric constant value may be greater than 10.

In any of the above aspects, the second dielectric constant value may be 10.2.

In any of the above aspects, the second dielectric constant value may be 20.

In any of the above aspects, dimensions of the at least one high dielectric material may be configured to be equal to, or greater than, dimensions of the at least one conductive arm.

In any of the above aspects, the at least one high dielectric material may be 0.04λ in thickness.

In any of the above aspects, the first and second conductive arms may be printed conductive traces or casted metallic conductive traces.

Any of the above aspects may further comprise a feed port electrically coupled to the first conductive arm such that the first conductive arm is a part of an unbalanced transmission line; a balun electrically coupled between a ground and the second conductive arm, the balun is configured to convert the unbalanced transmission line into a balanced transmission line that is capable of driving both of the first and second conductive arms.

In any of the above aspects, the balun may be a tapered balun.

The antenna element in any of the above aspects may be configured as any one of a dipole antenna, monopole antenna, helical antenna, and a patch antenna.

In any of the above aspects, the dipole antenna may be a printed dipole or a casted metallic dipole.

In any of the above aspects, the first and second conductive arms may be provided on a same surface of the substrate.

In any of the above aspects, the surface of the substrate upon which the first and second conductive arms are provided may be dependent on a feed port.

In any of the above aspects, the feed port may be one of a excitation throw slot, a microstrip balun, and a transition from microstrip line to differential lines.

Any of the above aspects may further comprise a plurality of the first antenna elements configured to receive electromagnetic fields, at least some of the plurality of the first antenna elements being uniformly aligned in the first direction; and a plurality of the second antenna elements configured to transmit the electromagnetic fields, at least some the plurality of the second antenna elements being uniformly aligned in the second direction.

In any of the above aspects, the first antenna elements may alternate with the second antenna elements at a regular distance around a central area of the reflector element.

In any of the above aspects, the first and second antenna elements may be configured as any one of a dipole antenna, monopole antenna, helical antenna, and patch antenna.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1A:
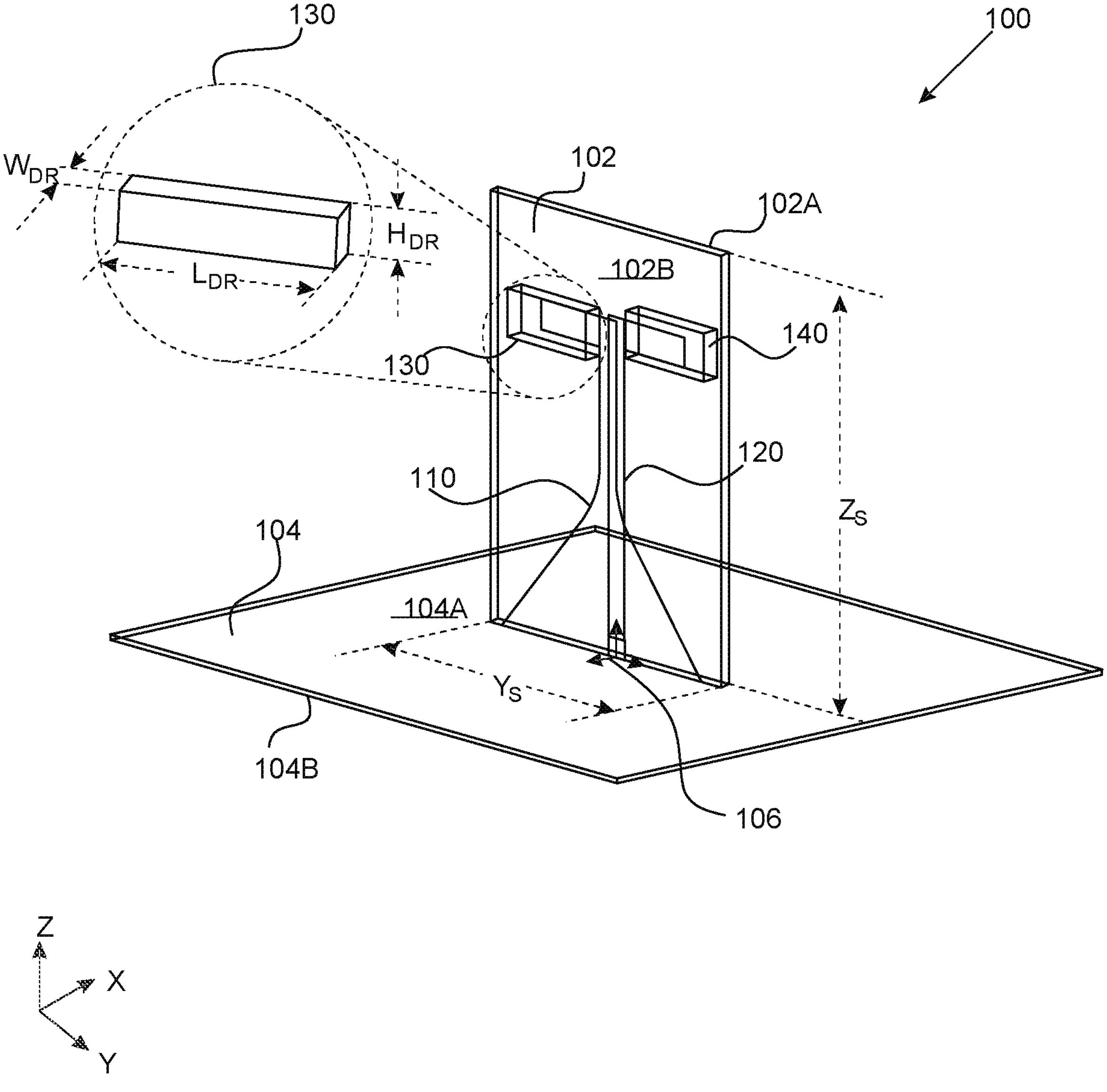
FIG. 1A-1D shows perspective, top, front side, and rear side views, respectively, of an example dipole antenna element in accordance with the present disclosure.

The following is a partial list of acronyms and associated definitions that may be used in the following description:

MIMO Multiple Inputs Multiple Outputs
DK Dielectric Constant
DLPDA Dielectrically Loaded Printed Dipole Antenna
EBG Electromagnetic Bandgap
PCB Printed Circuit Board
FD Full Duplex Directional references herein such as “front”, “rear”, “up”, “down”, “horizontal”, “top”, “bottom”, “side” and the like are used purely for convenience of description and do not limit the scope of the present disclosure. Furthermore, any dimensions provided herein are presented merely by way of an example and unless otherwise specified do not limit the scope of the disclosure. Furthermore, geometric terms such as “straight”, “flat”, “curved”, “point”, “normal”, “orthogonal” and the like, and references to direction of polarization, are not intended to limit the disclosure any specific level of geometric precision, but should instead be understood in the context of the disclosure, taking into account normal manufacturing tolerances, as well as functional requirements as understood by a person skilled in the art.

FIGS. 1A-1D show perspective, top, front side, and rear side views, respectively, of an example antenna element in accordance with the present disclosure in the form of a dipole antenna element 100. The dimensions of certain features have been exaggerated for illustration purposes. It is to be appreciated that although the illustrate embodiments are described with respect to a dipole antenna, other types of antenna elements, including monopole antenna, helical antenna, and patch antenna, may be adopted mutatis mutandis. In example embodiments, the antenna element, such as dipole antenna element 100, may be configured to transmit and receive radio frequency (RF) signals within a predetermined or operating frequency band through a wireless channel. For example, the dipole antenna element 100 may be part of an array antenna coupled to a base station system or other interface node and used to transmit or receive RF signals using the operating frequency band with user equipment (UE).

Dipole antenna element 100 includes a substrate 102 having a first surface 102A and an opposing second surface 102B. Two conductive regions 110 and 120 is each provided onto the substrate 102. The number of conductive regions may be less or more than two depending on the type of antenna element. In the illustrated embodiment, the conductive regions 110 and 120 are provided on respective surfaces 102A and 102B of the substrate 102 such that the two conductive regions 110 and 120 are separated by the thickness of the substrate 102, $T_s$. It is to be appreciated that in other embodiments, the conductive regions 110 and 120 may be provided on a same surface of the substrate 102 as described in more detail below. Each of the conductive regions 110, 120 includes a respective conductive arm (112, 122) and a respective leg portion (114, 124). The dipole antenna element 100 further includes a first and a second high dielectric material 130 and 140 provided on respective substrate surfaces 102A and 102B to provide spatial covering of the conductive arms 112, 122 as described in more detail below.

In some embodiments, dipole antenna element 100 is formed from printed circuit board (PCB) that includes a dielectric substrate that support one or more conductive regions such as conductive regions 110 and 120. The PCB substrate may include a conductive ground plane layer with a ground connection, one or more dielectric substrate layers. The substrate 102 may also be made of any other suitable material such as fiberglass or a flexible film substrate made of polyimide that have a dielectric constant greater than that of air (ε of 1.0). Although the first conductive region 110 is shown as being provided on the first surface 102A of the substrate 102, and the second conductive region 120 on the opposing second surface 102B of the substrate 102, it is to be understood that the two conductive regions 110 and 120 may be provided on the same surface of the substrate. In some embodiments, whether the conductive traces are provided on the same substrate surface or different substrate surfaces may be dependent on the type of signal feed used as discussed in more detail below. In some embodiments, a further coating (not shown) such as a solder mask, or sometimes referred to as solder resist, can be selectively applied over the finished conductive regions to provide additional protection against wear, oxidation, and corrosion. The two conductive regions 110 and 120 are separated and electrically insulated from each another by the thickness of the substrate 102. The substrate 102 may be perpendicularly supported on a reflector 104.

The dimension of substrate 102 is defined by length Zs, width Ys, and thickness Ts. The substrate 102 may be sized to sufficiently support the conductive regions 110 and 120, as well as to permit electrical and grounding connections. In one example embodiment, the substrate 102 is a 45 mm by 45 mm PCB for a dipole antenna element having a dipole length of 29.25 mm that is configured to operate in the 3.5 GHz frequency band. Different dimensions of the PCB may be used to accommodate conductive arms/conductive traces of different sizes depending on the configuration or type of antenna. In some example embodiments, the substrate 102 may be 1.575 mm thick, although thicker and thinner substrates could be used. The thickness of the substrate 102 may affect the resonant frequency of the dipole antenna element 100. Thus, the length of the conductive arms 112, 122 may be adjusted accordingly based on the substrate thickness to achieve the desired resonant frequency.

In some embodiments, the substrate 102 may be a thin film substrate having a thickness thinner than, in most cases, around 600 μm, or thinner than around 500 μm, although thicker substrate structures are possible. Typical thin film substrate materials may be flexible printed circuit board materials such as polyimide foils, polyethylene naphthalate (PEN) foils, polyethylene foils, polyethylene terephthalate (PET) foils, and liquid crystal polymer (LCP) foils. Further substrate materials include polytetrafluoroethylene (PTFE) and other fluorinated polymers, such as perfluoroalkoxy (PFA) and fluorinated ethylene propylene (FEP), Cytop® (amorphous fluorocarbon polymer), and HyRelex materials available from Taconic™. In some embodiments the substrates are a multi-dielectric layer substrate.

In some embodiments, the first and second conductive regions 110 and 120 may be conductive traces formed from a conductive material such such as copper or a copper alloy, or alternatively, aluminum or an aluminum alloy, printed onto the substrate 102. Example methods of conductive trace printing may include laminating a layer of conductive material onto substrate 102 and then etching the conductive layer using a mask. Other suitable methods of forming dipole conductive traces onto a substrate, such as casted metallic traces may also be used.

The two conductive regions 110, 120 may be centrally disposed on respective surfaces 102A and 102B of the substrate 102. For embodiments where the conductive regions 110 and 120 are provided on the same substrate surface, they may be bisymmetrically positioned about a central axis of the substrate surface. Each of the conductive regions 110 and 120 may include a respective first and second conductive arm 112, 122 configured to resonate electromagnetic signals, at RF frequencies for example, during transmission or be caused to resonate while receiving electromagnetic signals. In the illustrated embodiment, the conductive regions 110 and 120 further include a respective first and second leg portions 114, 124. In the illustrated example, the conductive arms 112 and 122 are integrally formed at a substantially perpendicular angle to respective leg portions 114 and 124 in the shape of an inverted "L" such that the conductive arms 112 and 122 are approximately a height $H_d$ above the respective substrate surfaces 102A and 102B. In the present disclosure, "substantially equal" and "approximately" can include a range within normal manufacturing tolerances, for example +/−5%. The conductive arms 112 and 122 may be formed at other angles with the respective leg portions 114 and 124 depending on the type of antenna.

The conductive region 110 is configured as an electrically isolated conductor on the surface 102A of the substrate. In some embodiments, such as the one shown in FIGS. 1A to 1D, the dipole antenna element 100 is driven at a single feed point that is electrically coupled to the second conductive region 120 on surface 102B. This single-ended drive signal may cause the dipole antenna element 100 to become an unbalanced transmission line. In such embodiments with an unbalanced transmission line, a balun 108 may be used to convert the unbalanced transmission line to a balanced one through impedance transformation so that the feed signal may be capable of driving both of the conductive arms 112 and 122. In the illustrated embodiment, the balun 108 is electrically coupled to the leg portion 114 of the first conductive region 110. The balun 108 may be integrally formed with the conductive region 110 and electrically grounded. In some embodiments, the balun 108 may be coupled to the ground layer of a multi-layer PCB reflector 104. The balun 108 may be a tapered balun as shown in the example embodiment in FIGS. 1A to 1D. In particular, the tapering angle may be vary slowly relative to operating wavelength. For example, a tapering balun 108 may have a base width $Y_b$ at a first balun end of approximately 39 mm, and gradually tapers to the same width as the leg portion 114 $Y_f$ of approximately 3.25 mm over a balun height $H_b$ that is approximately λ/4. For high frequency operations, where the wavelength is shorter, the tapering may be done over a relatively shorter length, thus making tapered baluns suitable for wideband applications. It is to be appreciated that other baluns, such as Marchand, microstrip, etc may also be used.

Figure 1B:
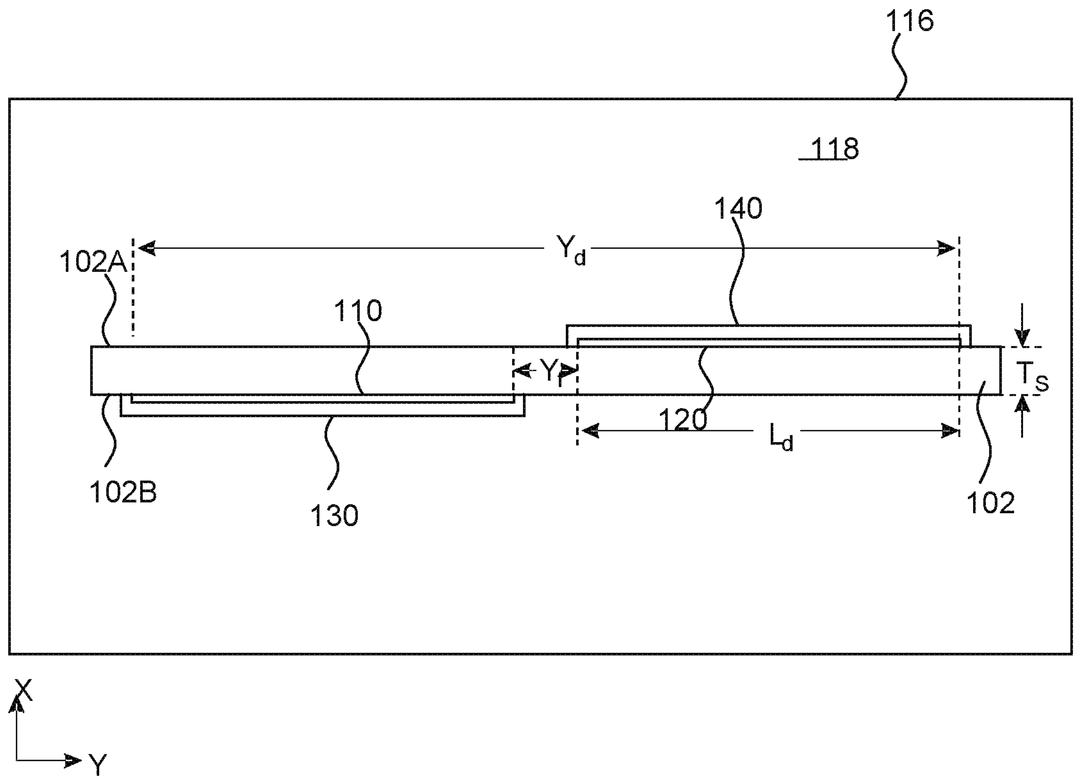
Figure 1C:
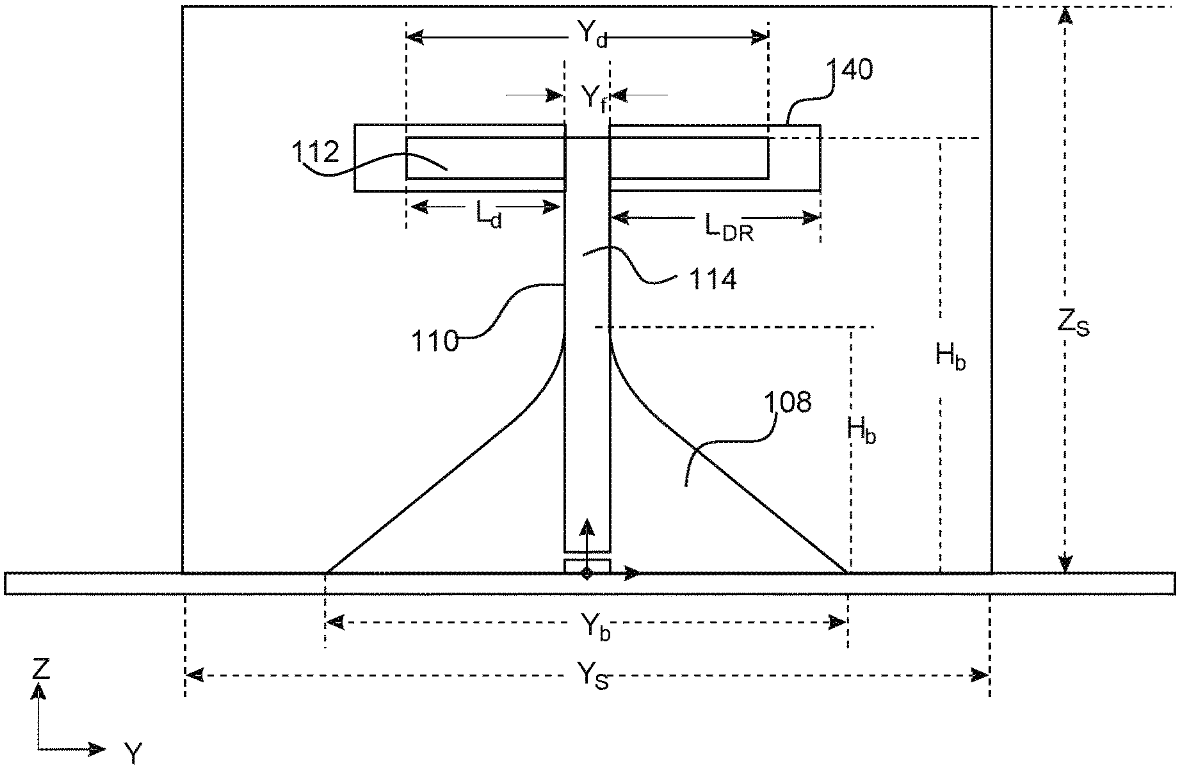
Figure 1D:
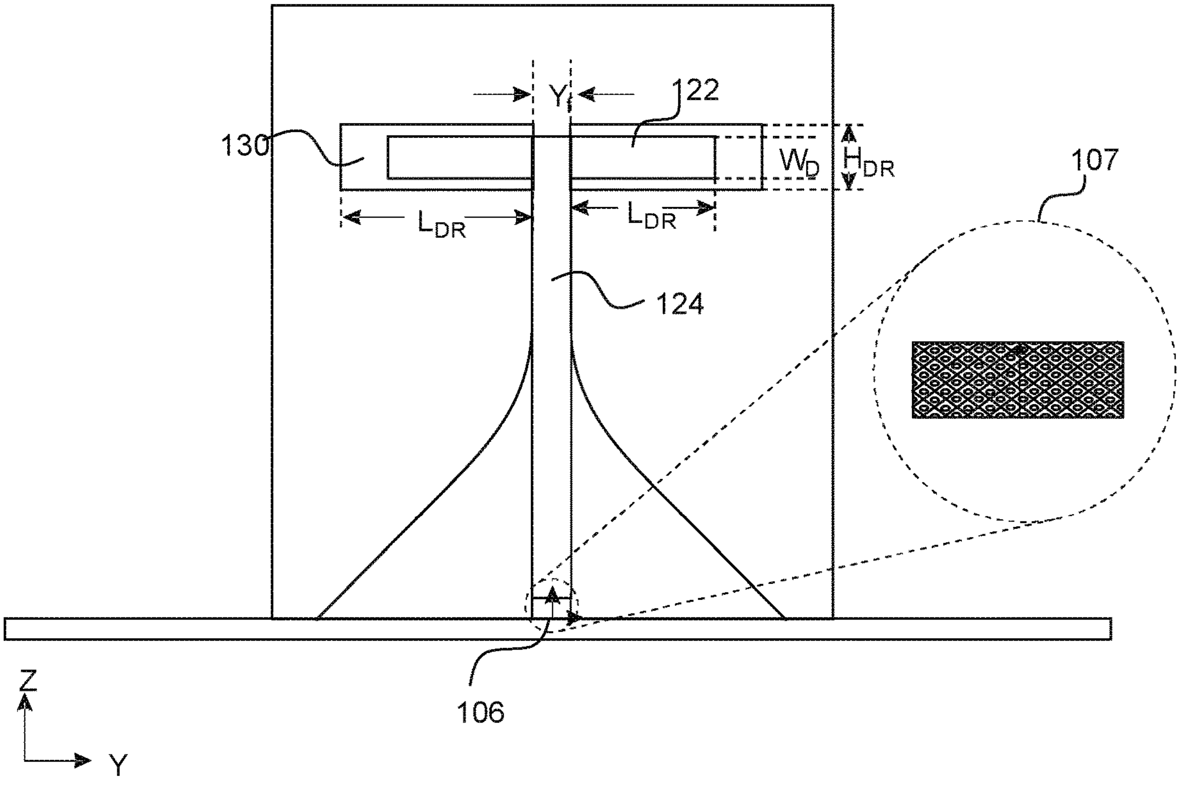

In the illustrated embodiment, with the exception of a balun 108, the conductive region 120 is substantially identical in dimensions to the conductive region 110. The conductive region 120 is configured as an electrically isolated conductor on the surface 102B of the substrate 102. In some embodiments, the leg portion 124 on the surface 102B is aligned with the leg portion 114 on the first surface 102A such that the two conductive arms 112 and 122 have a lengthwise separation gap of the width of one of leg portions 114 or 124 ($Y_f$) as best shown in FIG. 1B. Leg portion 124 of the second conductive region 120 extends from second conductive arm 122 to a feed port 106 on the substrate 102. The feed port 106 may be electrically coupled to an RF input (not shown) of the reflector 104. The feed port 106 may electrically couple the leg portion 124 to a RF feed line (not shown) through the conductive layer of the reflector 104. In some embodiments where the reflector 104 is a multilayer PCB, the PCB may include one or more layers of conductive traces for distributing RF signals from the RF feed line (not shown) throughout the reflector 104. The RF feed line may connect the antenna element such as dipole antenna element 100, through an amplifying and phase shifting module (not shown), to a transmit/receive (Tx/Rx) circuitry (not shown). When transmitting signals, antenna element is fed RF signals generated by the transmit/receive (Tx/Rx) circuitry through amplifying and phase shifting module for transmission over a wireless channel. When receiving signals, RF signals received through a wireless channel at the antenna element are sent through amplifying and phase shifting module to transmit/receive (Tx/Rx) circuitry. Amplifying and phase shifting module may be configured to apply antenna element excitation weights to enable a magnitude and phase of the RF signal applied to or received from the antenna element such as dipole antenna element 100.

Whether conductive regions 110 and 120 are provided on opposite substrate surfaces or the same substrate surface may be dependent upon the type RF signal feeding technique implemented at feed port 106, which may include excitation throw slot, utilization of a microstrip balun, or transition from microstrip lines to differential lines. It is to be understood that other shapes and configurations of the balun may be possible corresponding to different types of dipole configurations.

For simulation purposes, the feed port 106 may be modelled as a feed element 107. In the illustrated embodiment, the feed element is modelled as a lumped port using the Ansys® High-Frequency Structure Simulator (HFSS) software. It is to be appreciated that other types of simulation feed elements, such as a wave port, may also be used.

As previously described, the conductive arms 112 and 122 may be equally dimensioned and symmetrical to one another while extending substantially orthogonal to the respective leg portions 114 or 124. The conductive arms 112 and 122 may be integrally formed with the respective leg portions 114 and 124, as well as balun 108 and feed port 106. Thus, although described as different portions of the dipole antenna element 100, the balun 108, leg portions 114, 124, and conductive arms 112 and 122 may not be distinct or physically separate portions of the antenna element. The two conductive arms 112, 122 are separated by a distance of $Y_f$. The conductive arms 112 and 122 extend substantially parallel to the top surface 104A of the reflector 104 towards the outer edges of the substrate 102 from its center axis. During operation, a current may oscillate or resonate in both of the conductive arms 112 and 122 in uniform direction, whether the current is driven by an input feed signal or induced by the received electromagnetic signals from a wireless channel. The radio waves resonated from each of the conductive arms 112 and 124 are 180° out of phase such that they may be constructively superimposed together. The effective operating wavelength $\lambda_{eff}$ of the dipole antenna element 100 may be dependent on the conductive arm length $L_d$ as described in more detail below.

The dipole antenna element 100 further includes a first high dielectric material 130 and a second high dielectric material 140. The first high dielectric material 130 is configured to provide spatial covering of the first conductive arm 112 on the substrate surface 102A. Similarly, the second high dielectric material 140 is configured to provide spatial covering of the second conductive arm 122 of on the surface 102B of the substrate 102. Although two high dielectric materials are illustrated and described herein, it is to be understood that this is with respect to a dipole antenna element 100 and that the number of high dielectric materials in other embodiments may correspond with the number of conductive arms as dictated by the type of antenna element.

In the illustrated embodiment, the high dielectric materials 130 and 140 are generally in the shape of a rectangular slab to correspond with the overall shape of the conductive arms 110 and 120. It may be understood that in other embodiments, the high dielectric material 130, 140 may be of other configurations that may not correspond to the shape of the conductive arms, such as a cylindrical disk, semi-ovoid, hemispherical or any other suitable shape that may provide spatial covering of the conductive arms. Generally, the high dielectric materials 130 and 140 are made of ceramic or other low-loss dielectric material that has a dielectric constant ($\varepsilon_r$) that is higher than that of the substrate 102, which in the case of a PCB is typically in the range of 2.0 to 4.5. In some embodiments, a material having a dielectric constant of 10 or more may be considered as a high dielectric material, For example, the high dielectric material may include Ventec (VT-6710) and Roger (RO3010) which have a dielectric constant of approximately 10.2, as well as Low Temperature Cofired Ceramic (LTCC) with a dielectric constant of approximately 20. The high dielectric materials 130 and 140 may be integrally formed onto respective surfaces 102A and 102B of the substrate 102. Alternatively, the high dielectric materials 130, 140 may be coupled to the substrate 102 by any other suitable means, such as using an adhesive. The high dielectric materials 130, 140 are dimensioned to encase, or provide spatial covering, of the conductive arms exposed on the surfaces of the substrate 102. The presence of the high dielectric materials 130, 140 may cause the electromagnetic field to be confined in the near field around the antenna elements. Conceptually, by being covered by the high dielectric materials, the conductive arms 112, 122 may radiate more along its top surface and less near the end edges. With the high dielectric materials, the antenna element is said to be dielectrically loaded.

Some example dimensions of the dipole antenna element 100 are now described with reference to FIGS. 1A to 1D. Generally, the dipole antenna element 100 may be designed with specific dimensions in order to emit or receive wireless RF signals within a desired operating frequency or frequency band. For example, the dipole antenna element 100 may have an operating frequency of 3.5 GHz, or any operating frequency within the range of about 700 MHz to 20 GHz or higher, for example about 3.3 GHz to about 3.7 GHz.

The operating wavelength ($\lambda_o$) in free space may be determined in accordance with Equation (1) as follows:

$$\lambda_o = \frac{c}{f_r} \qquad \text{Equation (1)}$$

Where c is the speed of light of $3\times10^8$ m/s, and $f_r$ is the operating frequency. For example, to operate at 3.5 GHz, the operating wavelength in free space would be approximately 0.0857 m or 85.7 mm.

In some embodiments, the speed of the electromagnetic signal, and correspondingly the operating wavelength, varies in the presence of a dielectric material in accordance with Equation (2) below:

$$\lambda_d = \frac{\lambda_o}{\sqrt{\varepsilon_r}} \quad \text{Equation (2)}$$

Where $\lambda_d$ is the effective wavelength, and $\varepsilon_r$ is the relative permittivity, or dielectric constant of the high dielectric material. The parameter $\sqrt{\varepsilon_r}$ is representative of the refractive index, which by definition is the square root of the dielectric constant. Typically, the length of dipole antenna (L) is approximately half of the operating wavelength, or λ/2. In some embodiment, the length of dipole antenna may be determined by Equation (3) as:

$$L = \frac{c}{2f_r\sqrt{\varepsilon_r}} \quad \text{Equation (3)}$$

The dielectric constant $\varepsilon_r$ may vary depending on the high dielectric material thickness $H_{DR}$ and the conductive trace width (W). Effective dielectric constant $\varepsilon_{eff}$ may be determined by Equation (4) as follows:

$$\varepsilon_{eff} = \frac{\varepsilon_r + 1}{2} + \frac{\varepsilon_r - 1}{2}\left[\left(1 + \frac{12h}{W}\right)^{-0.05} + 0.04\left(1 - \frac{W}{h}\right)\right] \quad \text{Equation (4)}$$

Where h is the thickness of the substrate 102 thickness $T_s$, and W is the width of the conductive arm width $W_{DR}$.

The length of the conductive arms may further be adjusted by a ΔL in accordance with Equation (5) below:

$$L = \frac{c}{2f_r\sqrt{\varepsilon_{eff}}} - 2\Delta L \quad \text{Equation (5)}$$

Where the parameter ΔL may be determined by Equation (6) as follows:

$$\Delta L = 0.412 * h\left\{\frac{\varepsilon_{eff} + 0.3}{\varepsilon_{eff} - 0.258}\right\}\left\{\frac{\frac{W}{h} + 0.264}{\frac{W}{h} + 0.813}\right\} \quad \text{Equation (6)}$$

The width of the conductive arm is approximately one third of the dipole length L:

$$W_d = \frac{L}{3} \quad \text{Equation (7)}$$

As may be discerned from at least Equation (3), a higher dielectric constant value $\varepsilon_r$, may decrease dipole length L. Thus, the dielectric material of the high dielectric materials 130, 140 may, at least in part, facilitate a decrease in antenna size at least because the antenna size is inversely proportional of its dielectric constant. The decrease in antenna size may come at the expense of lower operating frequency and a narrower bandwidth as described in more detail below.

From the above equations, including Equations (4), (5) and (6), the thickness of the substrate and width of the conductive trace forming the conductive arm may also be adjusted to achieve a desired dipole length. For example, as may be discerned from Equation (6), a thicker substrate of higher h value may increase the value of parameter ΔL, and thereby decrease dipole length L as per Equation (5). As a further example, increasing conductive arm width W would likely increase the effective dielectric constant $\varepsilon_{eff}$ as per Equation (4), which also decreases dipole length L as per Equation (5).

In some embodiments, Equations (1) to (7) may be used for determining baseline design parameters that are to be further optimized for a dielectrically loaded antenna in accordance with the present disclosure. For example, baseline design parameters, such as dimensions of the various components, as determined through Equations (1) to (7) may be further adjusted for example through simulations to achieved desired operating parameters, including operating frequency band.

The high dielectric materials 130 and 140 are configured to provide spatial covering of the conductive arms 110 and 120, respectively. Thus, the dimensions of the high dielectric materials 130 and 140 are at least equal to or greater than that of the conductive arms 110 and 120. For example, for a dipole antenna element having a high dielectric material with a dielectric constant of 10.2, the dipole length $L_d$ may be approximately 13 mm, or approximately 0.15λ, and a width $W_d$ of approximately 3.2 mm. The corresponding high dielectric materials 130, 140 may be 15.5 mm in length $L_{DR}$, or approximately 0.18λ in length, and approximately 5 mm in width $W_{DR}$ with a thickness of approximately 3.18 mm.

Figure 2:
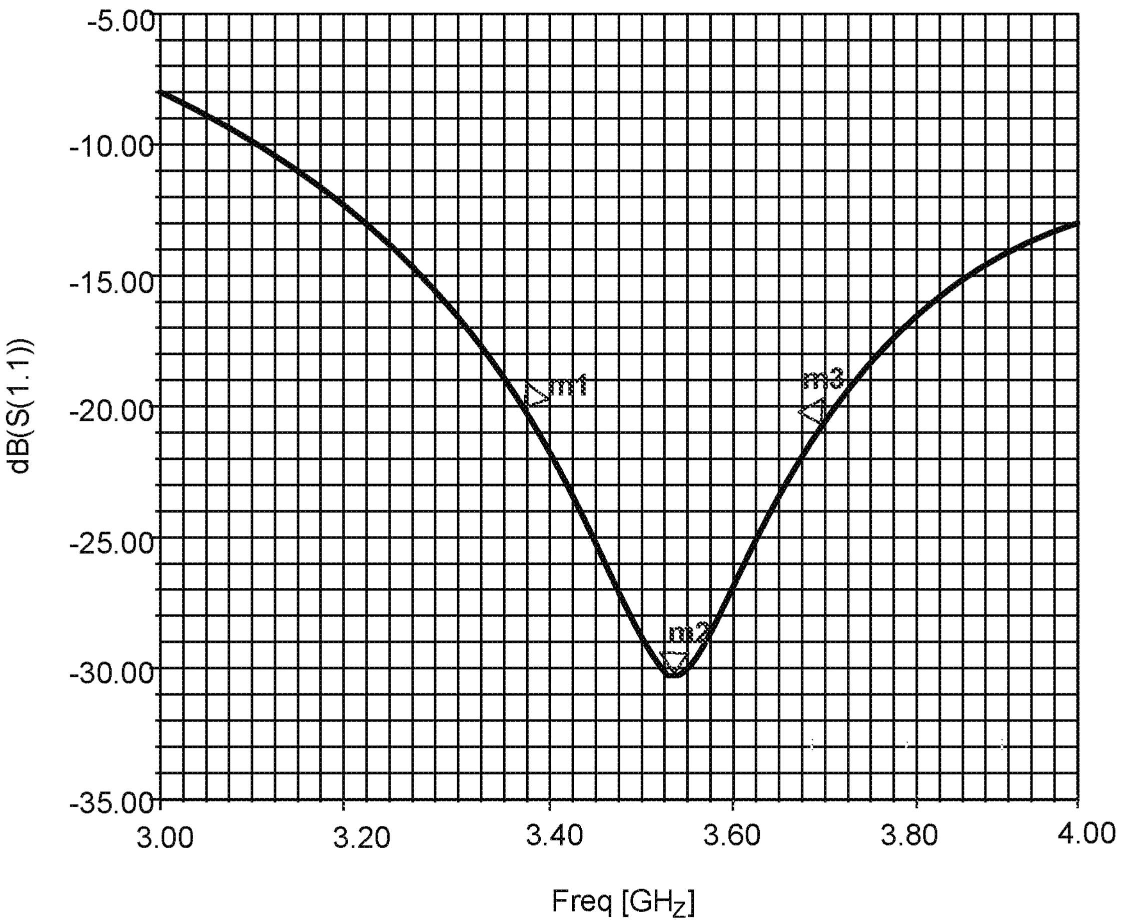
FIG. 2 shows an example simulation result of the S11 parameter of the dipole antenna element of FIGS. 1A-1D.
Figure 3:
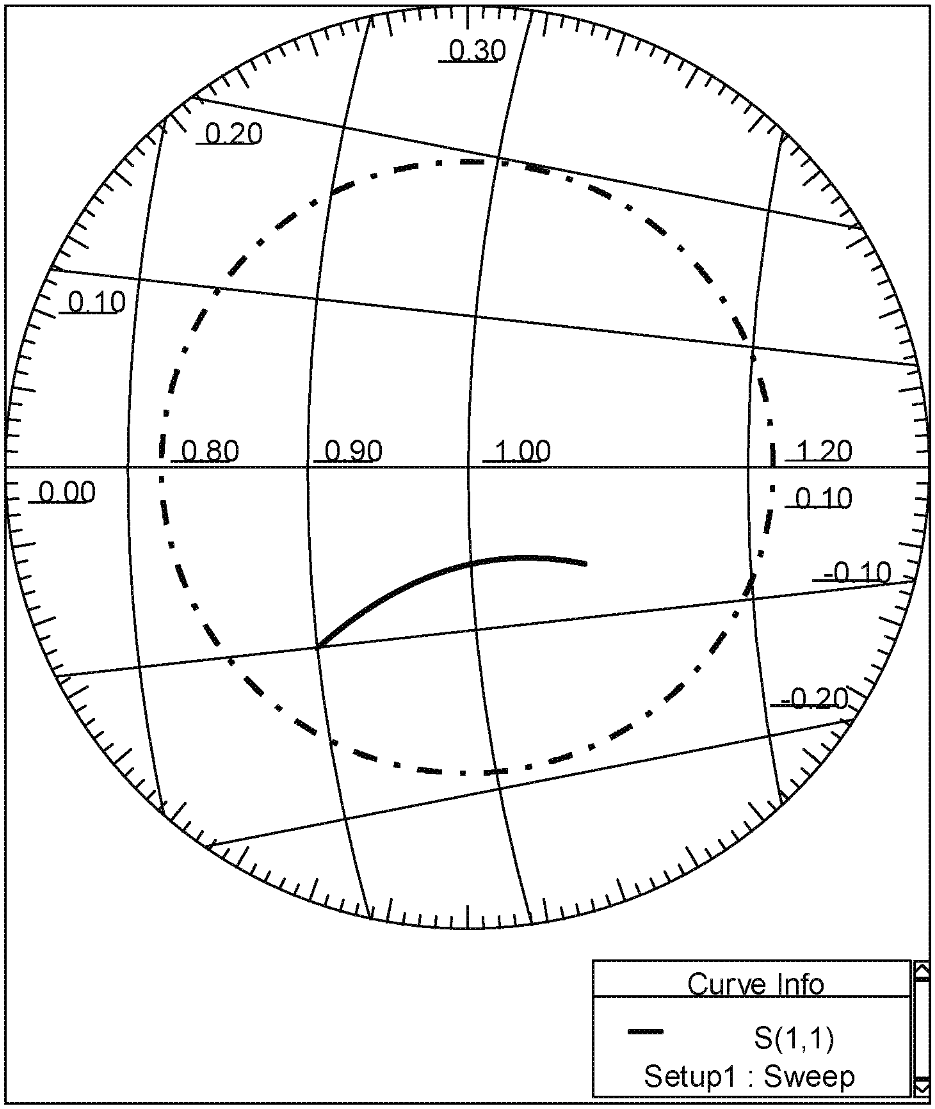
FIG. 3 shows the S11 from FIG. 2 plotted on a Smith Chart.
Figure 4:
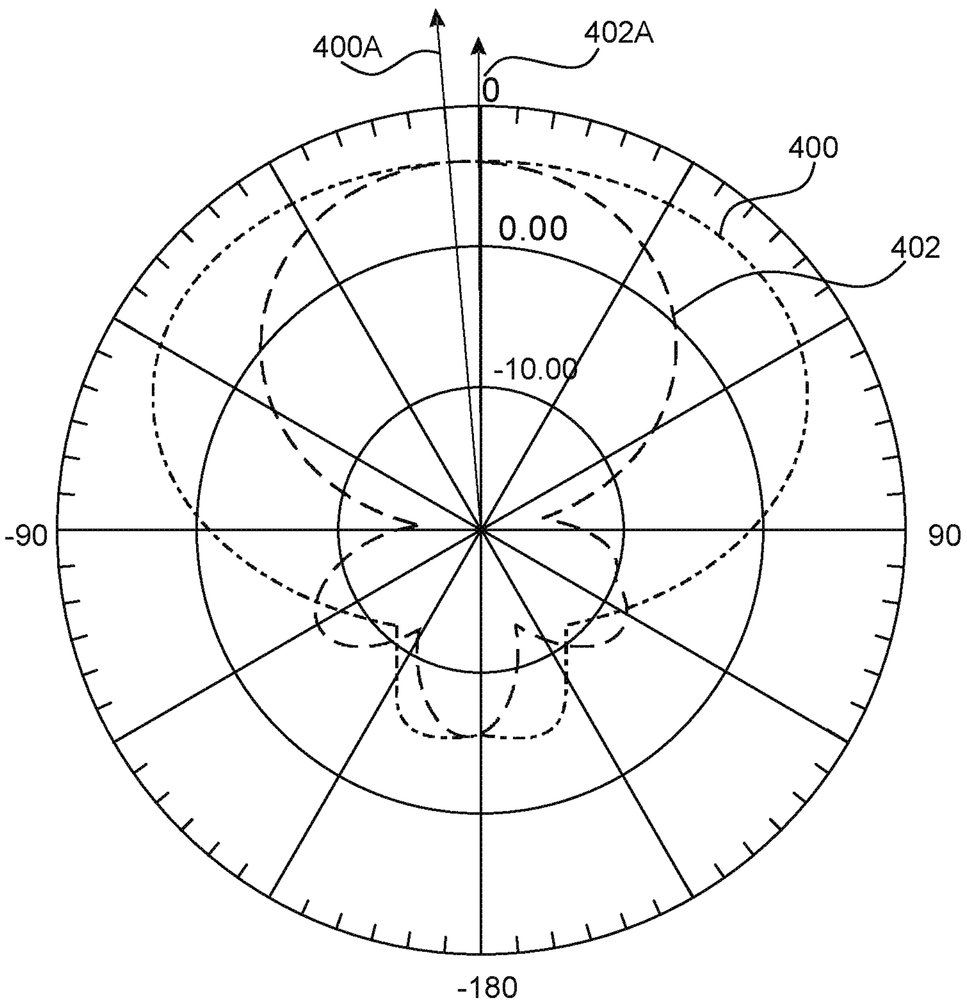
FIG. 4 shows an example of simulated E-plane radiation pattern for the example dipole antenna element in FIGS. 1A-1D.

For purposes of illustrating operation of dipole antenna element in accordance with the present disclosure, FIG. 2 shows an example simulation result of the $S_{11}$ return loss parameter of the example dipole antenna element 100. As may be observed from FIG. 2, the dipole antenna element exhibits a −20 dB return loss bandwidth of approximately 340 MHz, or approximately 10% of the operating frequency value. FIG. 3 shows the S11 return loss parameter plotted on a Smith Chart. FIG. 4 shows example simulated radiation patterns for an example dipole antenna element 100 having high dielectric materials with a dielectric constant of 10.2 radiating in two planes, namely φ=0° with 400 and φ=90° with 402. As shown in FIG. 4, the resulting RF signal beam peaks 400A and 402A with minimized side lobes.

As commonly known in the art, S-parameters describe the input-output relationship between ports, or terminals, in an electrical system. For a two-port system with input port 1 and output port 2, the $S_{11}$ parameter represents how much input power is reflected from the antenna back to the input port 1, and hence is known as the reflection coefficient, sometimes often referred to as the return loss.

Figure 5:
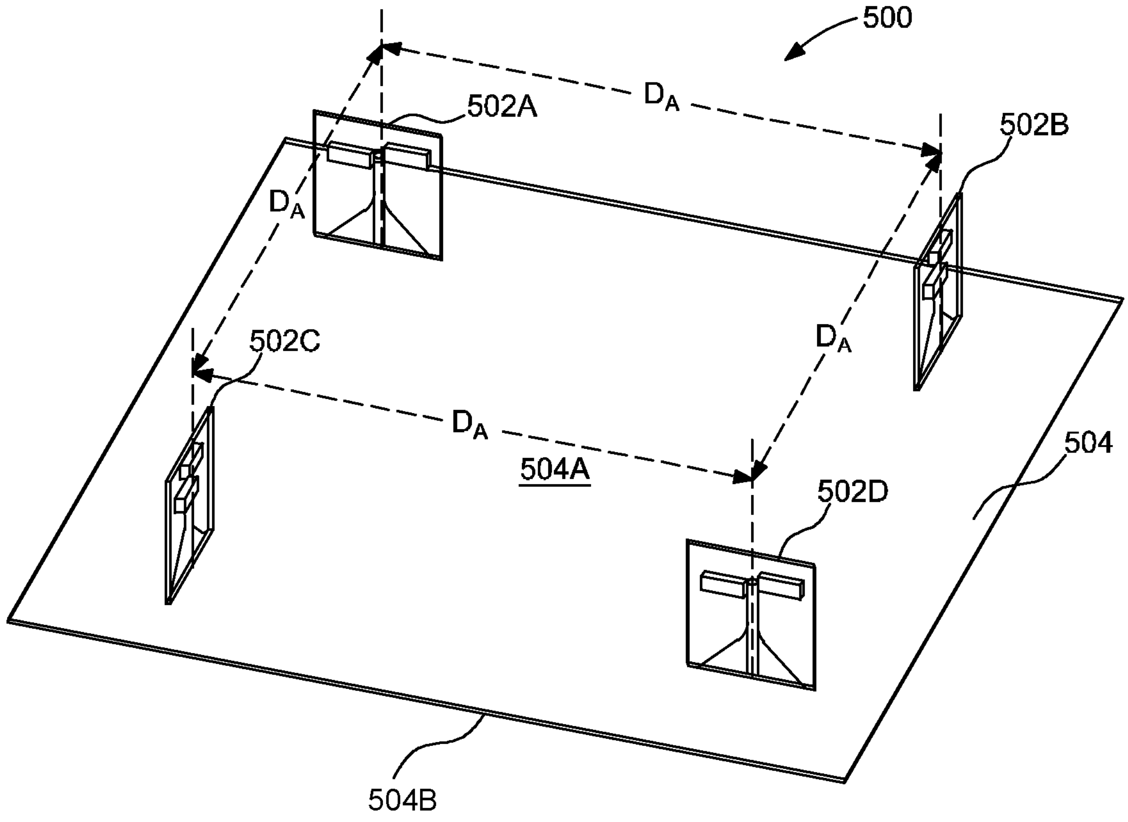
FIG. 5 shows a perspective view of an antenna array structure in accordance to example embodiments in accordance with the present disclosure.

FIG. 5 illustrates a perspective view of an antenna array structure 500 in accordance to example embodiments. In some embodiments, the antenna array structure 500 may be configured to transmit and receive radio frequency (RF) signals within a predetermined or operating frequency band through a wireless channel. The antenna array structure 500 includes a planar reflector element 504 that supports a set of dipole antenna elements 502A to 502D (referred to generically as dipole antenna elements 502) in accordance with the present disclosure. It is to be understood that although dipole antenna elements are shown, other antenna element types may be implemented. Each of the dipole antenna elements 502 may be a dipole antenna element 100 as described above. The dipole antenna element 502 all extend from the same side (referred to herein as the top surface 504A) of the reflector element 504 and are symmetrically arranged in alternating fashion around a central area of the top surface 504A of reflector element 504. In an example embodiment, the reflector element 504 is a multi-layer PCB that includes a conductive ground plane layer with a ground connection, one or more dielectric layers, and one or more layers of conductive traces for distributing control and power signals throughout the reflector element 504. By way of non-limiting example, in one possible configuration the reflector element 504 is a 300 mm by 300 mm square, although several other shapes and sizes are possible. On a bottom surface 504B of the reflector element 504, there may be one or more RF interface elements, such as coaxial connectors in some embodiments, that are electrically coupled to one or more conductive pads. One or more RF feed lines (not shown), such as a coaxial cables in some embodiments, may be electrically coupled to each RF interface element. The conductive pads may be electrically coupled to one or more conductive traces of one or more conductive layers of the reflector element 504. The conductive traces may be electrically coupled to the one or more of the dipole antenna element 502 feed ports.

In the illustrated example, the antenna array structure 500 includes four dipole antenna elements 502A to 502D, positioned near at the four corners of the reflector element 504. In different example embodiments, the number of dipole antenna elements could be less than or greater than 4, and the relative locations and orientations could be different than that shown in the Figures. The dipole antenna elements 502 may operate at 3.5 GHz or any other suitable frequency bands.

Generally, at least some of the dipole antenna elements serving similar functions, i.e. transmitting or receiving, may be aligned in the same direction that is generally orthogonal to those of the antenna elements serving a different function. In the illustrated embodiment, dipole antenna elements 502A and 502D are provided at opposite diagonal corners of the reflector element 504 aligned substantially in the same orientation and may be used as transmitting antenna elements. Dipole antenna elements 502B and 502C in the opposite diagonal corners of reflector element 504 may be used as receiving antenna elements and are aligned substantially orthogonal to those of transmitting antenna elements 502A and 502D. In some embodiments, each one of the dipole antenna elements 502 may be spaced apart equidistantly from its horizontally and vertically adjacent dipole antenna elements by a distance of $D_A$. In the illustrated embodiment, the dipole antenna element 502A is approximately a $D_A$ of 200 mm, from its center, to the centers of both dipole antenna elements 502B and 502C. Similarly, the centers of dipole antenna elements 502B and 502C are approximately a $D_A$ of 200 mm away from the center of dipole antenna element 502D. The orthogonally aligned dipole antenna elements may provide two orthogonal polarizations with the transmitting antenna elements 502A, 502D and the receiving antenna elements 502B, 502C being configured to emit or receive RF signals in the horizontal X-Y plane in polarization directions that are directed at 90 degrees relative to each other. Thus, transmitting dipole antenna elements 502A, 502D and the receiving dipole antenna elements 502B, 502C are polarized in orthogonal directions generally parallel to the reflector element 504. The orthogonal alignment may suppress SI and thereby improve isolation between the transmitting and the receiving dipole antenna elements. Accordingly, in the illustrated embodiment, all four dipole antenna elements 502 may operate in the same frequency band (the 3.5 GHz band for example). In alternative embodiments, the transmitting and receiving dipole antenna elements 502 may operate in different frequency bands.

Figure 6:
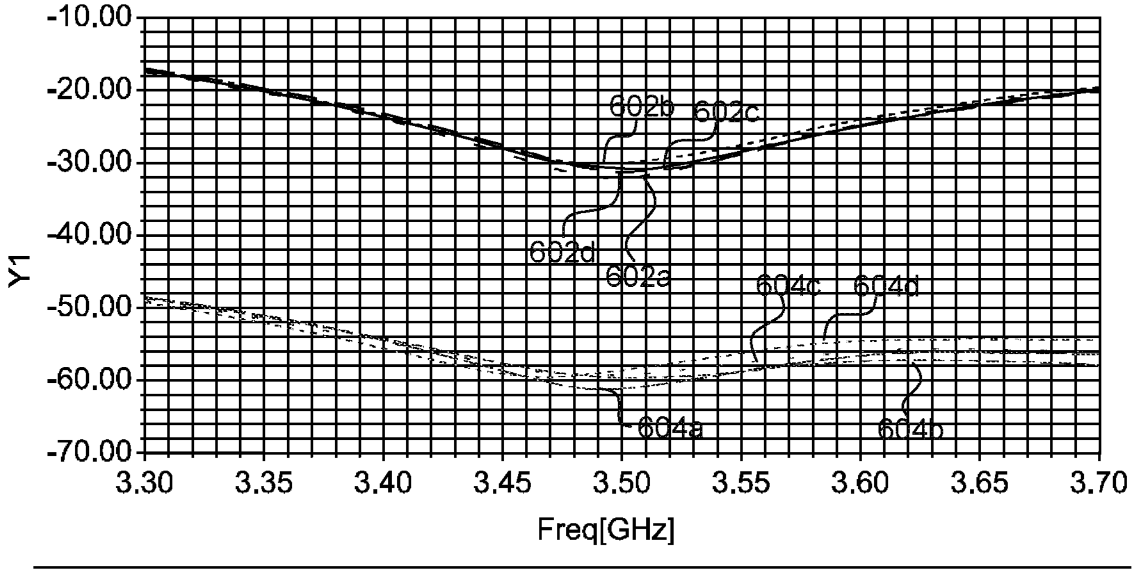
FIG. 6 shows an example simulation result of some of the S-parameters of the antenna array structure shown in FIG. 5.
Figure 7:
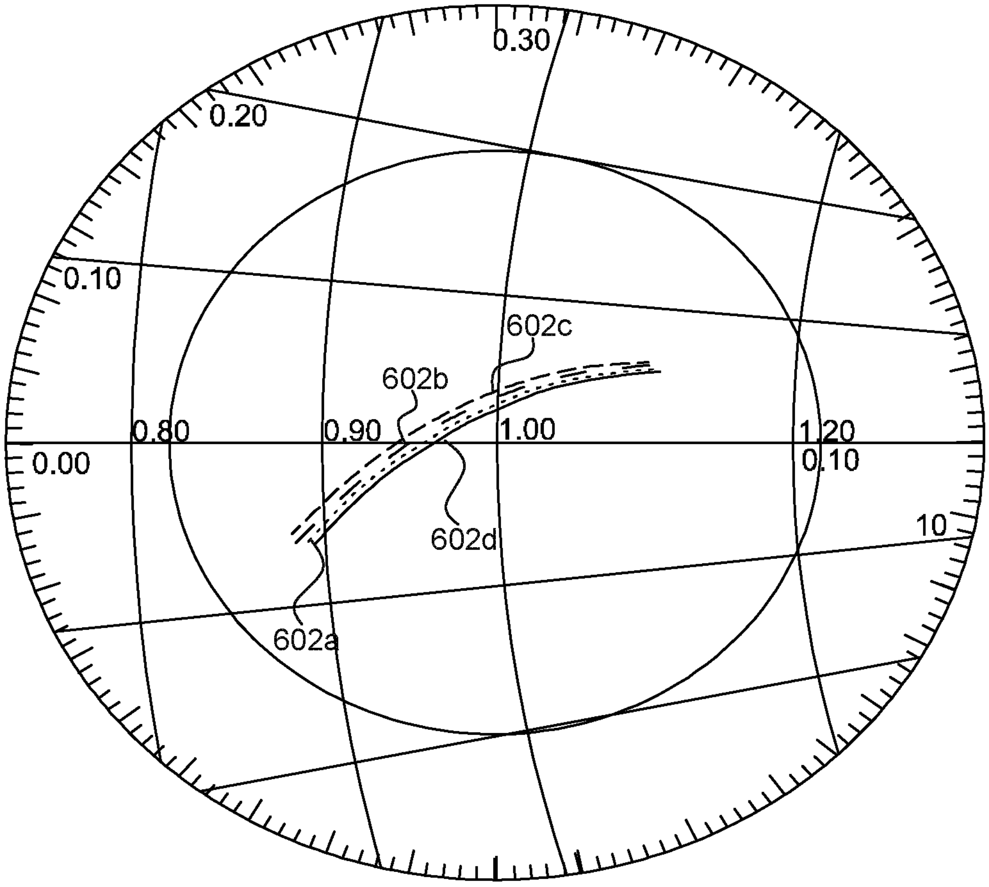
FIG. 7 shows the return loss S-parameters $S_{11}$, $S_{22}$, $S_{33}$, and $S_{44}$ from FIG. 6 plotted on a Smith Chart.
Figure 8:
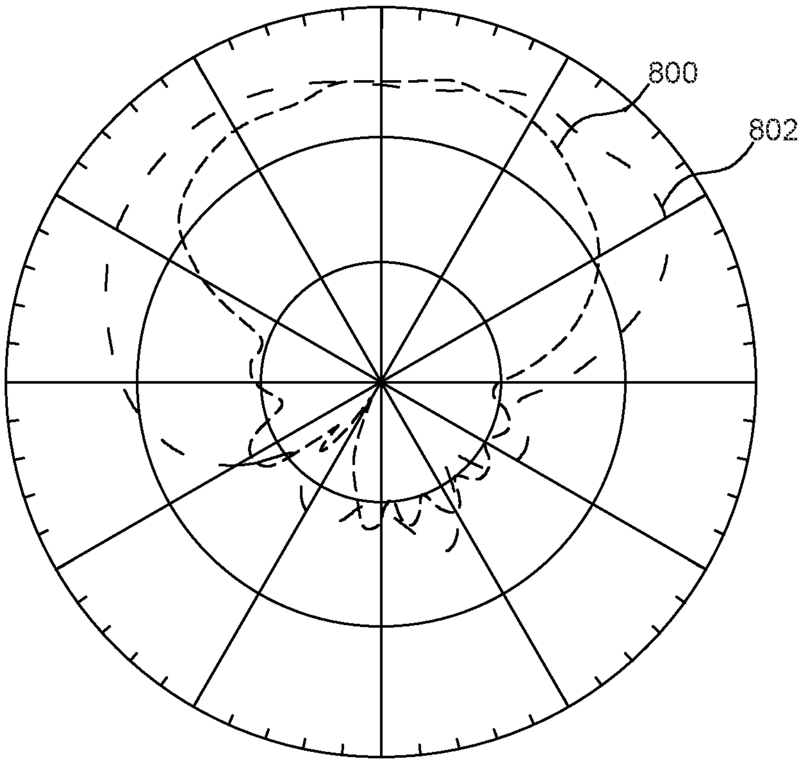
FIG. 8 shows an example simulated E-plane radiation patterns for an example antenna array structure similarly arranged as shown in FIG. 5.

FIG. 6 shows an example simulation result of some of the S-parameters of the antenna array shown in FIG. 5. As may be understood, with 4 dipole antenna elements, the antenna array structure may be treated as a four-port system for the purpose of a S-parameter analysis. As may be observed from FIG. 6, parameters $S_{11}$, $S_{22}$, $S_{33}$, and $S_{44}$, which are indicative of the reflection coefficients, or return loss, are plotted as plots 602*a*, 602*b*, 602*c*, and 602*d*, respectively, and are collectively referred to as return loss parameters 602. Particularly, the plots shows return loss parameters 602 generally having a −20 dB return loss bandwidth of about 350 MHz from approximately 3.3536 GHz to approximately 3.7 GHz, approximately 10% of the center frequency. With ports 1 and 3 being the transmitting ports (i.e. Tx ports), and ports 2 and 4 as the receiving ports (i.e. Rx ports), the isolation parameters $S_{12}$, $S_{14}$, $S_{32}$, and $S_{34}$ between the input ports and output ports are plotted as plots 604*a*, 604*b*, 604*c*, and 604*d*, collectively referred to as the isolation parameters 604. In particular, the simulated antenna array structure exhibits isolation parameters 604 generally having a 54 dB isolation bandwidth of approximately 200 MHz from approximately 3.4 GHz to approximately 3.6 GHz; and a 50 dB isolation bandwidth of approximately 350 MHz over approximately the same 20 dB bandwidth frequency range. FIG. 7 shows the return loss S-parameters 602 (i.e. $S_{11}$, $S_{22}$, $S_{33}$, and $S_{44}$) plotted on a Smith Chart. As may be observed, the Smith Chart in FIG. 7 exhibits matching characteristics that are indicative of majority of input signal being transmitted with limited loss. FIG. 8 illustrates example simulated E-plane radiation patterns for an example antenna array structure having four dipole antenna elements 100 similarly arranged as those in FIG. 5 having high dielectric materials with a dielectric constant of 10.2. The antenna array structure is simulated to radiate in two planes, namely $\varphi=0°$ with 600 and $\varphi=90°$ with 602. The resulting dipole length is approximately 29.25 mm. As shown in FIG. 8, the antenna array structure exhibits RF radiation patterns 800 and 802 that show good directionality with minimized side lobes and a prominent main beam.

Figure 9:
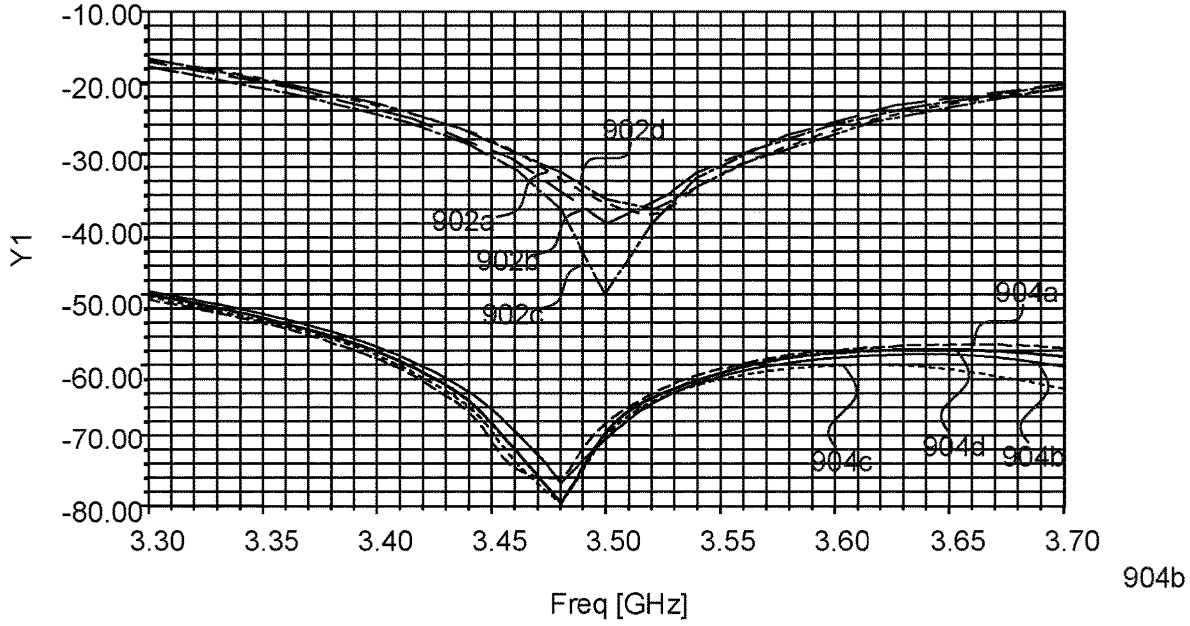
FIG. 9 shows an example simulation result of the return loss and isolation S-parameters of another example embodiment of an antenna array structure in accordance with the present disclosure having four dipole antenna elements 100 similarly arranged as those in FIG. 5 having high dielectric materials with a dielectric constant of 20.
Figure 10:
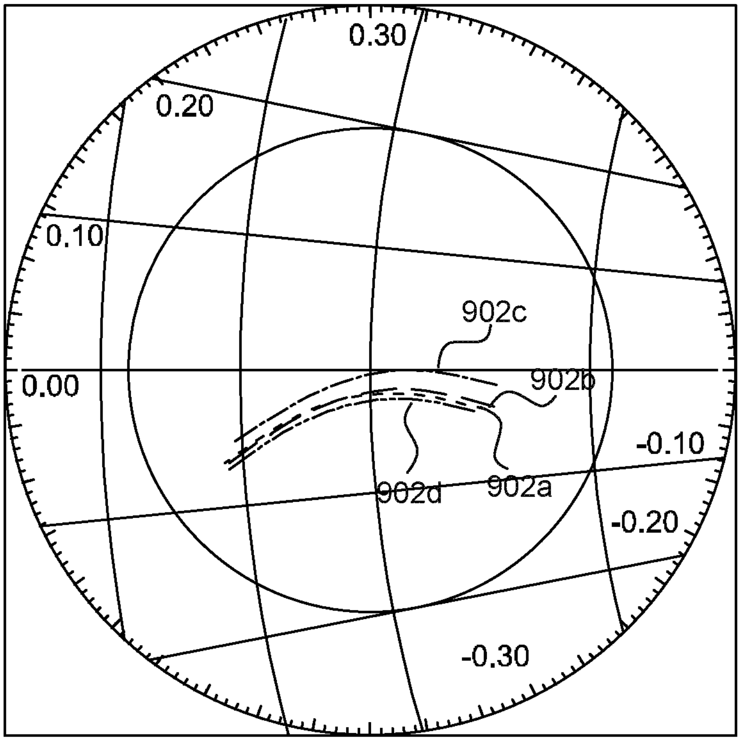
FIG. 10 shows the return loss S-parameters $S_{11}$, $S_{22}$, $S_{33}$, and $S_{44}$ from FIG. 9 plotted on a Smith Chart.
Figure 11:
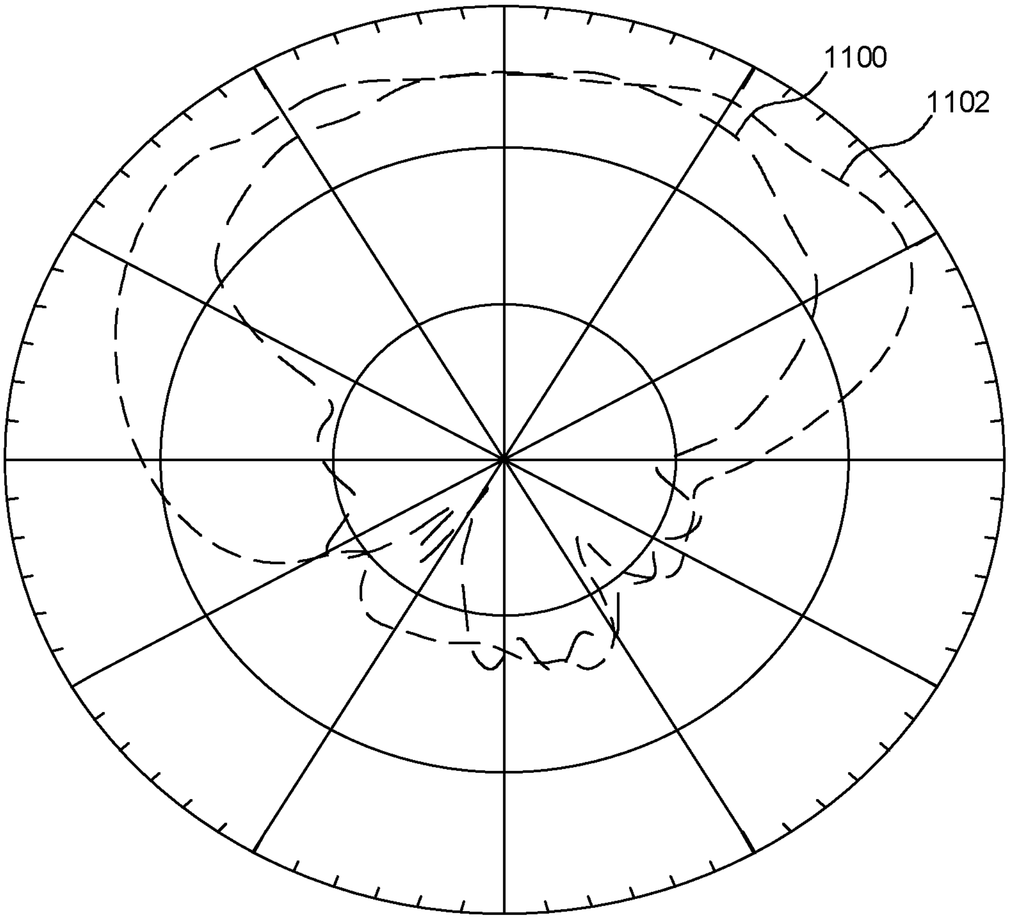
FIG. 11 shows an example simulated E-plane radiation patterns for the antenna array structure that generated FIG. 9.

FIG. 9 shows an example simulation result of the return loss and isolation S-parameters of another example embodiment of an antenna array structure in accordance with the present disclosure having four dipole antenna elements 100 similarly arranged as those in FIG. 5 having high dielectric materials with a dielectric constant of 20. As may be observed from FIG. 9, plots 902*a*, 902*b*, 902*c*, and 902*d* representative of parameters $S_{11}$, $S_{22}$, $S_{33}$, and $S_{44}$, respectively, are indicative of return loss, and collectively referred to as return loss parameters 902. Particularly, the return loss parameters 902 generally show a 20 dB reflection bandwidth of about 330 MHz from approximately 3.36 GHz to approximately 3.69 GHz, approximately 9.5% of the center frequency. With ports 1 and 3 being the transmitting ports (i.e. Tx), and ports 2 and 4 as the receiving ports (i.e. Rx), the isolation parameters $S_{12}$, $S_{14}$, $S_{32}$, and $S_{34}$ between the input and the output ports, collectively referred to as isolation parameters 904, are plotted as plots 904*a*, 904*b*, 904*c*, and 904*d*, respectively. In particular, the isolation parameters generally exhibit a 57 dB isolation bandwidth of approximately 280 MHz extending from approximately 3.4 GHz to approximately 3.68 GHz; and a 53 dB isolation bandwidth of approximately 330 MHz over approximately the same 20 dB bandwidth frequency range. FIG. 10 shows the reflection S-parameters 902, (i.e. $S_{11}$, $S_{22}$, $S_{33}$, and $S_{44}$ in FIG. 9) plotted on a Smith Chart. As it may be observed, increased dielectric constant of the high dielectric materials may improve isolation at the cost of decreased bandwidth. FIG. 11 shows example simulated radiation patterns for the antenna array structure that generated FIG. 9. The antenna array structure is simulated to radiate in two planes, namely φ=0° with 1100 and φ=90° with 1102. As shown in FIG. 11, the antenna array structure exhibits RF radiation patterns 900 and 902 that maintain good directionality with minimized side lobes and a prominent main beam. Due to the increased dielectric constant of the high dielectric materials, the dipole length shortens to approximately 24.75 mm compared to that of the antenna array structure that generated FIGS. 6, 7, and 8.

Figure 12:
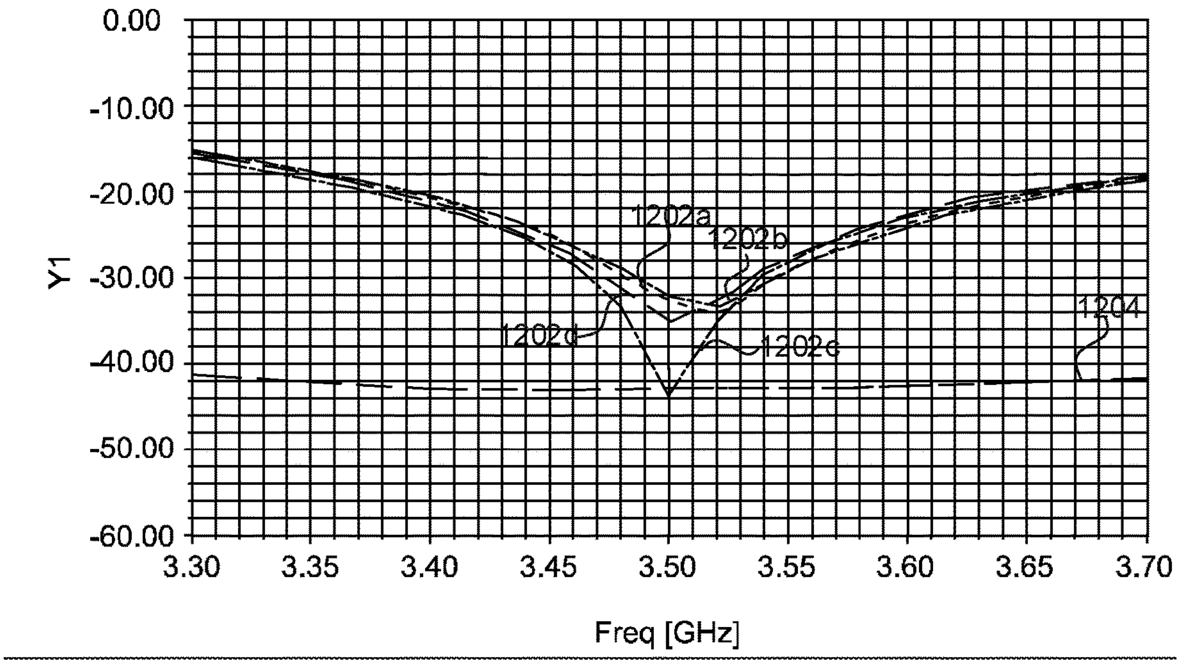
FIG. 12 shows an example simulation result of the return loss and isolation S-parameters of an antenna array structure having four dipole antenna elements without any high dielectric materials arranged similar to those in FIG. 5.
Figure 13:
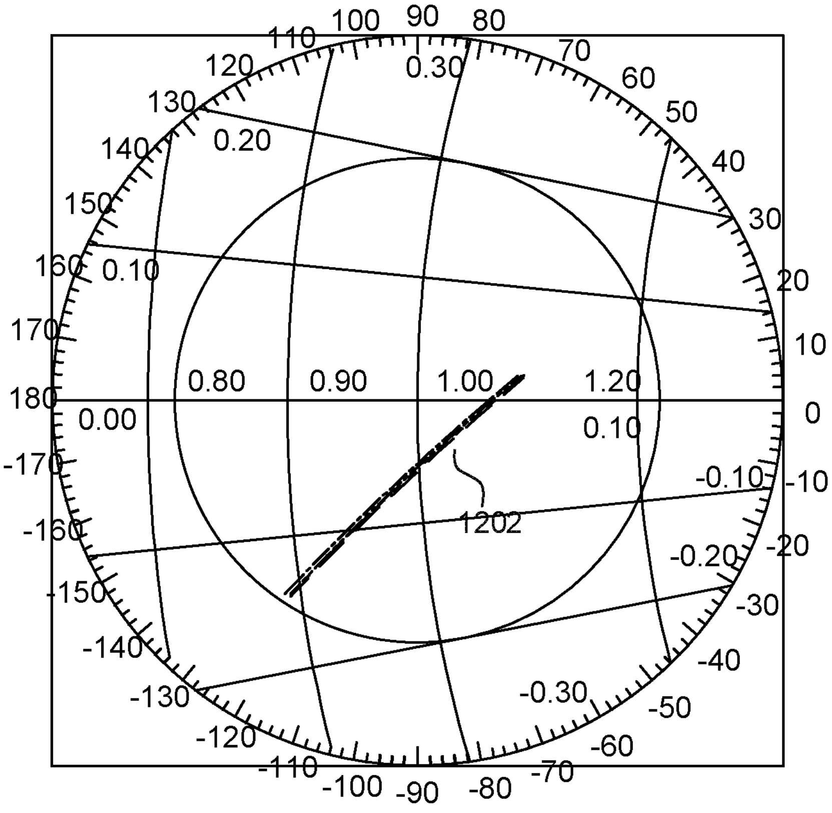
FIG. 13 shows the return loss S-parameters $S_{11}$, $S_{22}$, $S_{33}$, and $S_{44}$ from FIG. 12 plotted on a Smith Chart.
Figure 14:
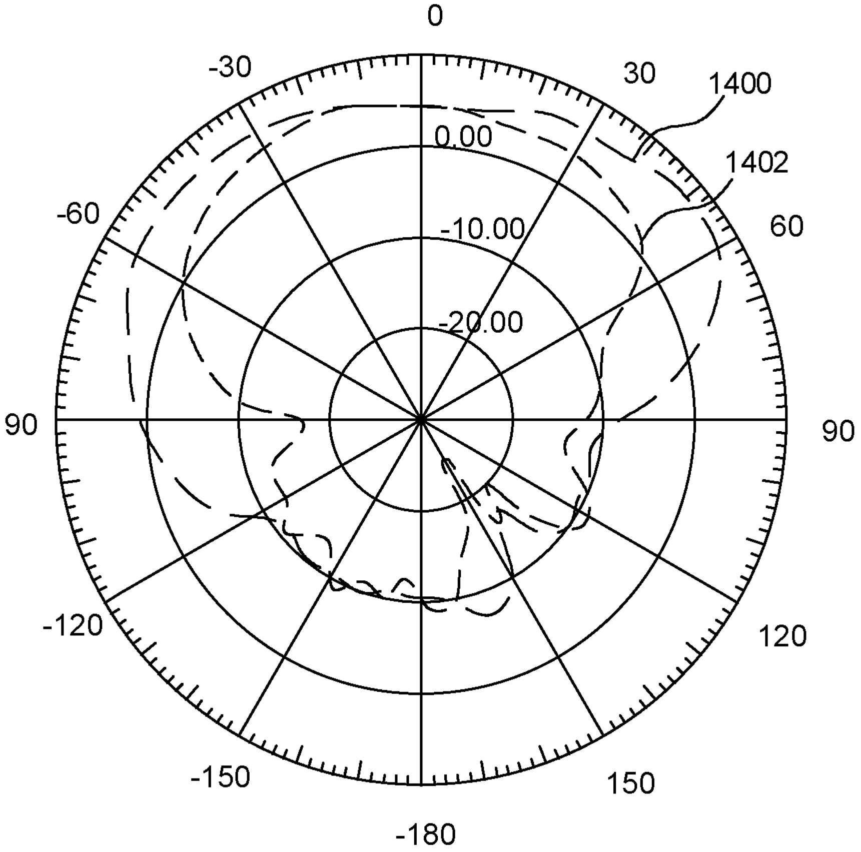
FIG. 14 shows an example simulated E-plane radiation pattern of the antenna array structure that generated FIG. 12.

As it may be appreciated that conceptually, the high dielectric materials 130, 140 of the dipole antenna element in accordance with the present disclosure may be seen by electromagnetic fields as a preferred path with less resistance. Thus, the electromagnetic coupling between the transmitting antenna elements, such as 502A and 502D in FIG. 5, and the receiving antenna elements, such as 502B and 502C, are reduced at least because the electromagnetic field is, in part, confined in the near field surrounding the dipole antenna elements due to the presence of the high dielectric materials. Hence, the SI between the transmitting and the receiving antenna elements may be further mitigated in addition to the orthogonal alignment of the dipole antenna elements. By way of illustration, FIGS. 12 to 14 show simulated reflection/isolation S-parameter, the reflection S-parameters Smith Chart, and E-plane radiation pattern for an antenna array structure having four dipole antenna elements without any high dielectric materials arranged similar to those in FIG. 5. FIG. 12 shows parameters $S_{11}$, $S_{22}$, $S_{33}$, and $S_{44}$ of the simulated antenna array structure, plotted as plots 1202*a*, 1202*b*, 1202*c*, and 1202*d* collectively referred to as the reflection loss parameters 1202, generally exhibit a −20 dB return loss bandwidth of about 260 MHz from approximately 3.4 GHz to approximately 3.66 GHz, approximately 7.5% of the center frequency. Additionally, the isolation parameters $S_{12}$, $S_{14}$, $S_{32}$, and $S_{34}$, collectively referred to as the isolation parameters 1204, generally show approximately a 42 dB isolation bandwidth from 3.4 to 3.6 GHz. FIG. 13 shows the reflection loss S-parameters 1202 (i.e. $S_{11}$, $S_{22}$, $S_{33}$, and $S_{44}$) from FIG. 12 plotted on a Smith Chart. FIG. 14 shows an example simulated E-plane radiation pattern of the antenna array structure that generated FIG. 12. As shown in FIG. 14, the radiation pattern 1400 at φ=0° is greater than that of radiation pattern 1402 at φ=90°. The resulting dipole length is approximately 37.47 mm. As may be observed from FIGS. 12 to 14, in the absence of the high dielectric materials, the resulting antenna array structure may be characterized with decreased 20 dB bandwidth, decreased isolation between input and output ports, as well as increased dipole size.

The disclosed dipole antenna element and antenna array structures may be useful for one or more of achieving smaller dipole length, and hence a smaller antenna array structure size, as well as wider return loss bandwidth and improved isolation between transmitting and receiving antenna elements.

The disclosed antenna array structures may be implemented in various applications that use antennas, such as telecommunication applications (e.g., transceiver applications in wireless network base stations or wireless local area network access points). The dimensions and/or material constants described in this application for the various elements of the antenna elements and structures are non-exhaustive examples and many different dimensions or materials can be applied depending on both the intended operating frequency bands and physical packaging constraints.

The present disclosure may be embodied in other specific forms without departing from the subject matter of the claims. The described example embodiments are to be considered in all respects as being only illustrative and not restrictive. Various modifications and combinations of the illustrative embodiments, as well as other embodiments of the invention, will be apparent to persons skilled in the art upon reference to the description. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology. It is therefore intended that the appended claims encompass any such modifications or embodiments.

The invention claimed is:

1. A dipole antenna element comprising:

a substrate having a first surface and a second surface opposite to the first surface;

a first conductive region configured to receive or transmit electromagnetic signals provided on the first surface of the substrate, the first conductive region comprising a first conductive arm;

a first high dielectric material configured to provide spatial covering of the first conductive region provided on the first surface of the substrate, wherein the first high dielectric material is configured to direct electromagnetic fields to mitigate interference;

a second conductive region configured to receive or transmit electromagnetic signals provided on the substrate, the second conductive region comprising a second conductive arm; and a second high dielectric material configured to provide spatial covering of the second conductive arm region provided on the substrate, wherein the second high dielectric material is configured to direct electromagnetic fields to mitigate interference.

2. The dipole antenna element of claim 1, wherein the second conductive arm and second high dielectric material are provided on the second surface of the substrate.

3. The dipole antenna element of claim 1, wherein the substrate has a first dielectric constant value, and the high dielectric material has a second dielectric constant value that is greater than the first dielectric constant value.

4. The dipole antenna element of claim 3, wherein the second dielectric constant value is greater than 10.

5. The dipole antenna element of claim 4, wherein the second dielectric constant value is 10.2.

6. The dipole antenna element of claim 4, wherein the second dielectric constant value is 20.

7. The dipole antenna element of claim 1, wherein dimensions of the high dielectric material is configured to be equal to, or greater than, dimensions of the first conductive arm.

8. The dipole antenna element of claim 1, wherein the high dielectric material is 0.04λ in thickness.

9. The dipole antenna element of claim 1, wherein the first and second conductive arms are printed conductive traces or casted metallic conductive traces.

10. The dipole antenna element of claim 1, further comprising:

a feed port electrically coupled to the first conductive arm such that the first conductive arm is a part of an unbalanced transmission line; and a balun electrically coupled between a ground and the second conductive arm, the balun is configured to convert the unbalanced transmission line into a balanced transmission line that is capable of driving both of the first and second conductive arms.

11. The dipole antenna element of claim 10, wherein the balun is a tapered balun.

12. The dipole antenna element of claim 10, wherein the substrate is perpendicularly supported on a reflector.

13. The dipole antenna element of claim 1, wherein the dipole antenna element is a printed dipole element or a casted metallic dipole element.

14. The dipole antenna element of claim 1, wherein the surface of the substrate upon which the first and second conductive regions are provided is dependent on a feed port.

15. The dipole antenna element of claim 14, wherein the feed port is one of a excitation throw slot, a microstrip balun, and a transition from microstrip line to differential lines.

16. The dipole antenna element of claim 1, wherein the second conductive arm and second high dielectric material are provided on the first surface of the substrate.

17. The dipole antenna element of claim 1, wherein the first high dielectric material and second high dielectric material are the same.

18. The dipole antenna element of claim 1, wherein the first high dielectric material and second high dielectric material are integrally formed.

19. The dipole antenna element of claim 1, wherein the first high dielectric material and second high dielectric material have the same dielectric constant value.

20. The dipole antenna element of claim 1, wherein the first conductive region further comprises a first leg portion integrally formed with the first conductive arm at an angle to the first conductive arm.

21. The dipole antenna element of claim 1, wherein the first conductive region further comprises a first leg portion integrally formed with the first conductive arm at a substantially perpendicular angle to the first conductive arm such that the first conductive region forms a shape of an inverted "L"; and wherein the second conductive region further comprises a second leg portion integrally formed with second conductive arm at a substantially perpendicular angle to the second conductive arm such that the second conductive region forms a shape of an inverted "L".

* * * * *